United States Patent [19]
Komatsu

[11] Patent Number: 6,094,449
[45] Date of Patent: Jul. 25, 2000

[54] SPREAD SPECTRUM COMMUNICATION SYNCHRONIZATION ACQUISITION DECODING APPARATUS

[75] Inventor: Masahiro Komatsu, Tokyo, Japan

[73] Assignee: NEC Corporation, Japan

[21] Appl. No.: 09/075,163

[22] Filed: May 8, 1998

[30] Foreign Application Priority Data

May 12, 1997 [JP] Japan .................................. 9-120395

[51] Int. Cl.[7] .................................................. H04K 1/00
[52] U.S. Cl. .......................... 375/136; 375/142; 375/143; 375/144; 375/150; 375/152
[58] Field of Search ................... 375/136, 137, 375/142, 143, 144, 145, 150, 152

[56] References Cited

U.S. PATENT DOCUMENTS

| | | | |
|---|---|---|---|
| 5,822,384 | 10/1999 | Thebault et al. ......................... | 375/367 |
| 5,970,084 | 10/1999 | Honda ..................................... | 375/200 |
| 5,974,038 | 10/1999 | Shou et al. .............................. | 370/335 |
| 5,982,763 | 11/1999 | Sato ........................................ | 370/342 |

FOREIGN PATENT DOCUMENTS

| | | |
|---|---|---|
| 6-77931 | 3/1994 | Japan . |
| 8-97748 | 4/1996 | Japan . |
| 8-163002 | 6/1996 | Japan . |
| 8-237173 | 9/1996 | Japan . |
| 8-288169 | 11/1996 | Japan . |

*Primary Examiner*—Stephen Chin
*Assistant Examiner*—Dac V. Ha
*Attorney, Agent, or Firm*—Ostrolenk, Faber, Gerb & Soffen, LLP

[57] ABSTRACT

According to a spread spectrum communication synchronization acquisition demodulating apparatus which can acquire synchronization timing and immediately track variation of the synchronization timing irrespective of lots of noise, in a synchronizing circuit 100, a reception signal form an antenna is converted to a base band signal in a local oscillator 1 and an LPF 2, and sampled in S/H 3. In a correlator 4, the spreading code of the reception signal is multiplied by the symbol thereof to obtain a correlation value. In a symbol integrator 5, the correlation value is demodulated on the basis of the theoretical value of the symbol corresponding to the correlation value or the judgment value after demodulation, and integrated over plural symbols to obtain a power value. In a demodulation path selection unit 8, the power value from a short-time integration path search unit 6 is integrated for a short time to select higher power values in the magnification order, and the power value from a long-time integration path search unit 7 is integrated for a long time to select higher power values in the magnification order. The reception timing is selected from the power values selected in the short-time and long-time integration path search units, and the despreading is performed according to the reception timing in the correlator 9, and a composite signal is identified in a RAKE/SD unit 11 to obtain a judgment value.

20 Claims, 3 Drawing Sheets

SPREAD SPECTRUM COMMUNICATION SYNCHRONIZATION ACQUISITION DECODING APPARATUS

BACKGROUND OF THE INVENTION

1. Field of the Invention

The present invention relates to a spread spectrum communication synchronization acquisition decoding apparatus which is mainly used at a reception portion of a radio communication apparatus for spread spectrum (SS) communication, and performs synchronization acquisition and synchronization tracking of received signals and spreading codes in a direct sequence (DS) type spread spectrum communication.

2. Description of the Related Art

A direct sequence (DS) type spread spectrum (SS) communication has been more increasingly studied and developed in a cellular mobile communication field of car phones, etc. because of little interference between cellular phones and a large communication capacity.

A mobile radio communication is bidirectionally performed between a base station having a transmitter and a receiver and a mobile unit having a transmitter and a receiver by setting a radio channel between the base station and the mobile unit.

In this case, the transmitter basically performs digital modulation (primary modulation) such as QPSK, QAM, PSK or FSK modulation or the like on data such as audio data, image data, program data or the like which are digitized, generates a spreading code such as a pseudo noise signal (PN code) or the like in a spreading code generator, and then multiplies the digitally-modulated (primary-modulated) data (information signal) by the PN code thus generated to perform a spread spectrum modulation (secondary modulation). Further, the spread-spectrum-modulated (secondary-modulated) data is subjected to a phase modulation with predetermined carrier, and transmitted as a spread spectrum (SS) signal from an antenna.

On the other hand, the receiver basically receives the spread spectrum (SS) signal by an antenna, and converts it to an intermediate frequency signal or a base band signal. Thereafter, the synchronization of the spreading code used in the spreading code generator of the transmitter is acquired in a synchronizing circuit, and the same spreading code as the transmitter is transmitted to an despreading decoder. In the despreading decoder, the spread spectrum (SS) signal and the spreading code from the synchronizing circuit are multiplied to perform an despread demodulation, and finally the data are demodulated in an information demodulator. In the synchronizing circuit of the receiver, it is required to search a point which is coincident in phase with the transmitted spreading code and limit the timing of the phase-coincidence point in a predetermined range in order to acquire and keep the synchronization.

FIG. 3 is a block diagram showing the basic construction of a synchronizing circuit which is used in a receiver for the conventional spread spectrum (SS) communication.

In the synchronizing circuit, a received spread spectrum (SS) signal is converted to a base band signal by a local oscillator 1, a mixer 12 and a low pass filter (LPF) 2 which are prepared at the reception side, then the base band signal is sampled by a sample hold circuit 3 to obtain a sampled signal, and then the sample signal is transmitted to a correlator 4 which comprises a matched filter. The correlator 4 multiplies one period of the spreading code of the received spread spectrum (SS) signal and one period of a pre-prepared spreading code every chip, calculate the sum thereof and transmits the sum result to a synchronization detector 10. Here, the local oscillator 1, the mixer 12 multiplying the received signal and a local oscillated frequency signal and the low pass filter (LPF) 2 acts as a signal converter for converting the received signal to the base band signal.

FIG. 4 is a schematic diagram showing the basic construction of the correlator 4. The correlator 4 successively stores the spread spectrum (SS) signal converted to the base band signal into a shift register 4a every chip, and also it generates a spreading code sequence by a coefficient generator 4b and multiplies the spreading code sequence by a coefficient generator 4b and the spread spectrum (SS) signal stored in the shift register 4a every chip by a multiplier 4d. The multiplication result is transmitted to an adder 4c to calculate the sum of the multiplication result and output the sum result. When the spreading code sequence from the coefficient generator 4b and the spreading code of the received spread spectrum (SS) signal are coincident with each other in timing, the output of the adder 4c becomes maximum (matched pulse). This matched pulse is detected by the synchronization detector 10, and the despread demodulation is performed by using the above synchronization information.

In the case of the synchronizing circuit for the spread spectrum (SS) communication receiver as described above, if there are a lot of noise, an erroneous judgment of the synchronization position would occur more frequently. Therefore, in order to take a countermeasure to the noise, the output of the matched filter is added and summed up by the amount corresponding to several symbols, and then integrated over plural slots. However, the synchronizing circuit has another problem that when the synchronizing timing varies, it cannot immediately follow the variation if the integration time is long.

SUMMARY OF THE INVENTION

The present invention has been implemented to solve the above problem, and has an object to provide a spread spectrum communication synchronization acquisition demodulating apparatus in which a proper synchronization timing can be acquired with suppressing the erroneous judgment of the synchronization position in spite of a lot of noise, and also even when the synchronization timing varies, the variation of the synchronizing timing can be immediately tracked.

According to the present invention, a spread spectrum communication synchronization acquisition demodulating apparatus of a spreading code synchronizing circuit provided in a radio communication apparatus for performing a data communication in which when a spread spectrum signal which is obtained by modulating transmission data and subjecting the modulated data to spread spectrum processing using a spreading code and then transmitted from a transmission side is demodulated as a reception signal to reproduce reception data at a reception side, the spread spectrum signal is subjected to despread spectrum processing using the same spreading code as the transmission side and then demodulated at the reception side, comprises: a signal converter for converting the reception signal to a base band signal; a sample hold circuit for sampling the base band signal, holding the sampled base band signal and outputting the sampling signal; a first demodulation correlator for correlating the sampling signal and the spread signal based on the spreading code to obtain a first correlation value; a symbol integrator for demodulating the first correlation value on the basis of any one of a theoretical value of a symbol corresponding to the first correlation value when the symbol is known or a judgment value after demodulation when the symbol is unknown and integrating the demodulation result over plural symbols to calculate the power of the integration of the plural symbols, thereby obtaining a power value; a short-time integration path search unit for adding power values over plural slots (i.e., integrating the power value for the integration time corresponding to the plural slots) and selecting higher power values, the number thereof corresponding to the number of the first correlators, in the magnification order of the power per slot from a larger power per slot to a lower power per slot; a long-time integration path search unit for adding power values over plural slots whose number is larger by plural slots than that of the short-time integration path search unit (i.e., integrating the power value for an integration time longer than that of the short-time integration path search unit by the time corresponding to plural slots) and selecting higher power values, the number thereof corresponding to the number of the first correlators, in the magnification order of power per slot from a larger power value to a lower power value; a demodulation path selection unit for selecting a reception timing for demodulation from the timings of the power values selected in the short-time and long-time integration path search units in the order of the magnification of power per slot; a second correlator for correlating the reception signal and the spread signal on the basis of the reception timing for demodulation to obtain a second correlation value; a detector for detecting the second correlation value and outputting a detection signal; and a signal composite unit for outputting a judgment value on the basis of a composite signal which is obtained by transmitting the detection signal to a RAKE/SD (Space Diversity) unit through the corresponding path to perform any one of RAKE synthesis and space diversity (SD) synthesis.

In the spread spectrum communication synchronization acquisition demodulating apparatus, it is preferable that in the symbol integrator the correlation value is demodulated on the basis of the theoretical value of the symbol corresponding to plural slots whose number exceeds 1 or the judgment value thereof, or in the symbol integrator the first correlation value is demodulated on the basis of the theoretical value of the symbol corresponding to each of plural parts to which a slot is divided, or the judgment value thereof, the demodulation result is integrated over plural symbols to calculate the power of the integration of the plural symbols, and then the power values of the plural parts are added to determine the power of the slot concerned.

Further, according to the present invention, a spread spectrum communication synchronization acquisition demodulating apparatus of a spreading code synchronizing circuit provided in a radio communication apparatus in which when a spread spectrum signal transmitted from a transmission side while subjected to spread spectrum processing with a spreading code after transmission data are modulated is subjected to reception demodulation as a reception signal to reproduce the reception data at a reception side, the spread spectrum signal is subjected to despread spectrum processing with the same spreading code as the transmission side and then demodulated at the reception side, comprises a signal converter for converting a received signal to a base band signal with a spreading code set as one symbol period; a sample hold circuit for sampling the base band signal, holding the sampling signal and outputting the sampling signal; a symbol integrator for demodulating the sampling signal on the basis of the theoretical value of a symbol when the symbol is known or a judgment value after demodulation for an unknown symbol, integrating the demodulation result over plural symbols to obtain a symbol integration value; a first correlator for correlating the symbol integration value and the spread signal based on the spreading code to determine the power of the correlation and obtain a power value; a short-time integration path search unit for adding power values of plural slots and selecting higher power values in the magnification order of power per slot from a larger power value to a lower power value by the number of the first correlators; a long-time integration path search unit for adding power values of plural slots whose number corresponds to the time longer than that of the short-time integration path search unit by the time corresponding to plural slots and selecting higher power values in the magnification order of power per slot from a higher power value to a lower power value by the number of the first correlators; a demodulation path selection unit for selecting a reception timing for demodulation from the timings of the power values which are selected by excluding the same timing and adjacent timings thereto in the short-time and long-time integration path search units in the magnification order of power per slot; a second correlator for correlating the reception signal and the spread signal on the basis of the reception timing for demodulation to obtain a second correlation value; a detector for detecting the correlation value and outputting a detection signal; and a signal composite unit for outputting a judgment value on the basis of a composite signal which is obtained by transmitting the detection signal to a RAKE/SD (Space Diversity) unit through the corresponding path to perform any one of RAKE synthesis and space diversity (SD) synthesis.

In the above-described spread spectrum communication synchronization acquisition demodulating apparatus, it is preferable that in the symbol integrator the sampling signal is demodulated on the basis of the theoretical of the symbol corresponding to the sample value of plural slots whose number exceeds 1 as the sampling signal, or a judgment value.

According to the present invention, in any one spread spectrum communication synchronization acquisition demodulating apparatus, there are obtained a spread spectrum communication synchronization acquisition demodulating apparatus in which the power per slot which corresponds to the timing selected in a short-time integration path search unit and is multiplied by a weight real number α is compared with the power per slot which corresponds to the timing selected in a long-time integration path search unit in a demodulation path selector, the same and adjacent timings are excluded, and the reception timings for demodulation are selected in the order of magnitude, a spread spectrum communication synchronization acquisition demodulating apparatus in which the weight real number α is set to a large value when a signal interference ratio (SIR) is large and set to a small value when the signal interference ratio is small, and in a demodulation path selector, the power per slot which corresponds to the timing selected in a short-time integration path search unit and is multiplied by a weight real number α is compared with the power per slot which corresponds to the timing selected in a long-time integration path search unit, the same timing and adjacent timings thereto are excluded, and the reception timings for demodulation are selected in the order of magnitude, or a spread spectrum communication synchronization acquisition demodulating apparatus in which in a demodulation path selector a specific predetermined number of timings which are selected in the magnitude order of the power per slot which corresponds to the timing selected in a short-time integration path search unit is compared with a specific predetermined number of timings which are selected in the magnitude order of the power per slot which corresponds to the timing selected in a long-time integration path search unit, and the same timing and adjacent timings thereto are excluded to select reception timings for demodulation.

DETAILED DESCRIPTION OF THE PREFERRED EMBODIMENTS

Preferred embodiments in which the present invention is applied to a spread spectrum communication synchronization acquisition apparatus will be described in detail with reference to the accompanying drawings.

Figure 1:
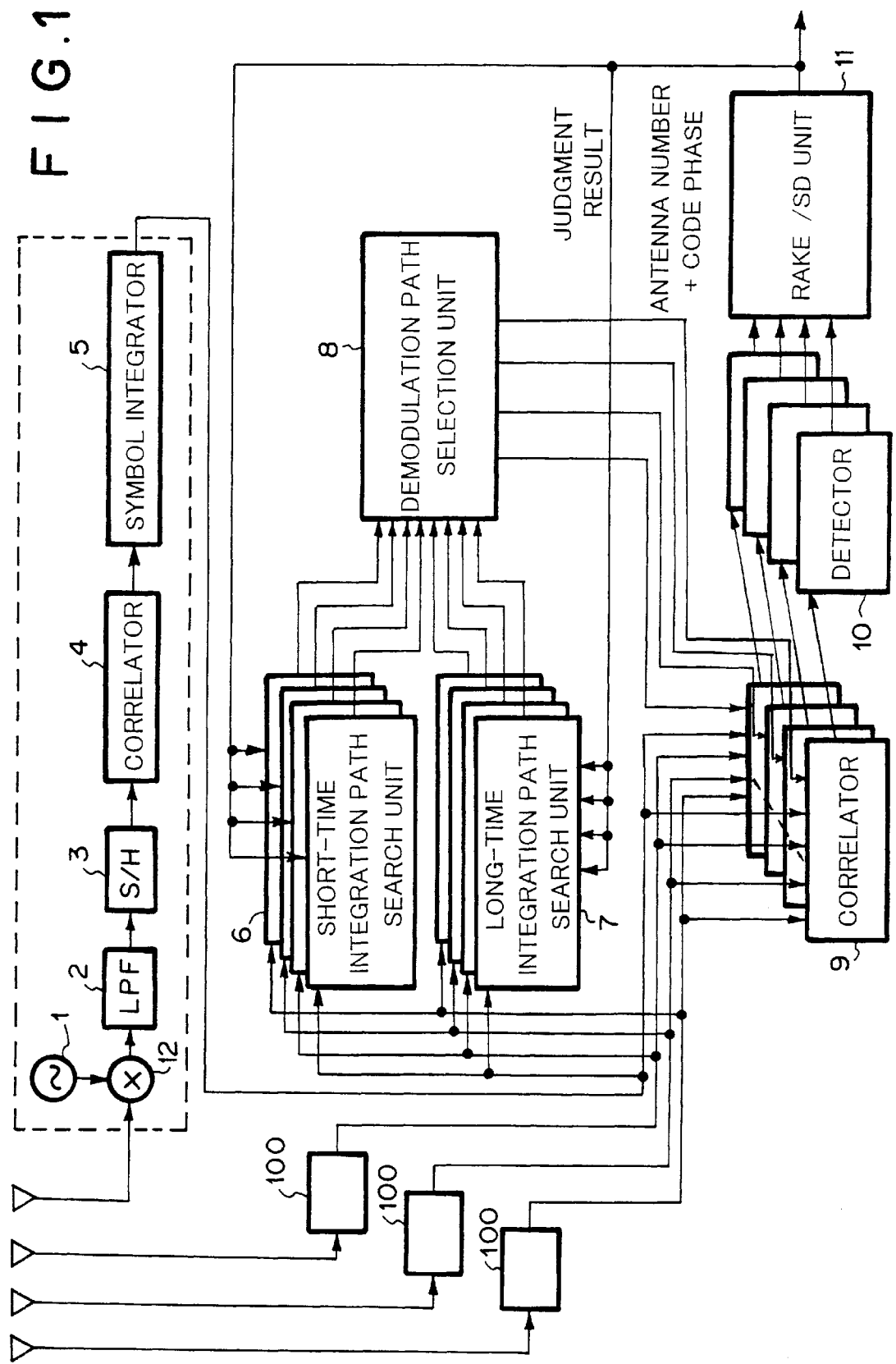
FIG. 1 is a block diagram showing the basic construction of a reception unit which is a main part of a spread spectrum communication synchronization acquisition demodulating apparatus according to a first embodiment of the present invention.

FIG. 1 is a block diagram showing the basic construction of a reception unit which is a main part of a spread spectrum communication synchronization acquisition demodulating apparatus according to a first embodiment of the present invention.

The spread spectrum communication synchronization acquisition apparatus of this embodiment is provided to a radio communication apparatus in which when a spread spectrum (SS) signal which is subjected to spread spectrum (SS) processing with a spreading code after transmission data are modulated in a transmission unit is received and demodulated as a reception signal in a reception unit to reproduce reception data, the data are despread with the same spreading code and then demodulated.

Therefore, a spreading code synchronization circuit which is provided to the reception unit is provided with plural synchronizing circuit each comprising a local oscillator 1 and a low pass filter (LPF) 2 which serve as a signal converting and generating unit for converting a reception signal from an antenna receiving a spread spectrum (SS) signal to a base band signal, a sample hold circuit (S/H) 3 for sampling and holding the base band signal and outputting the sampling signal, a first correlator 4 for demodulation for correlating the sampling signal and the spread signal based on the spreading code to obtain a first correlation value, and a symbol integrator 5 for demodulating the first correlation value on the basis of a theoretical value of the symbol corresponding to the first correlation value or a judgment value after demodulation for an unknown symbol to perform plural-symbol addition, and determining the power of the plural-symbol addition, thereby obtaining a power value.

Further, the spreading code synchronizing circuit comprises a short-time integration path search unit 6 for adding power values over plural slots and selecting timings in the magnification order of the power per slot from the timing providing the power value having the largest power per slot by the number of the first correlators 4, a long-time integration path search unit 7 for adding power values for a longer time than that of the short-time integration path search unit by the time corresponding to plural slots and selecting timings in the magnification order of the power per slot from the timing providing the power value having the largest power per slot by the number of the first correlators 4; a demodulation path selection unit 8 for selecting a reception timing for demodulation from the timings selected in the short-time and long-time integration path search units 6 and 7 in the magnification order of the power per slot, a second correlator 9 for correlating the reception signal and the spread signal on the basis of the reception timing for demodulation to obtain a second correlation value, a detector 10 for detecting the second correlation value and outputting a detection signal, and a RAKE/SD unit 11 serving as a signal composite unit for outputting a judgment value on the basis of a composite signal which is obtained by subjecting the detection signal to RAKE synthesis and Space Diversity (SD) synthesis through the corresponding paths.

That is, according to the spreading code synchronizing circuit, in the synchronizing circuit 100, the reception signal which is the spread spectrum (SS) signal received by the antenna is converted to a base band signal by the local oscillator 1 and the low pass filter (LPF) 2, and then this signal is sampled every ½ chip in the sample hold circuit (S/H) 3 and transmitted through a memory to the first correlator 4. The first correlator 4 comprises a matched filter. In the first correlator 4, the reception signal which is taken out from the memory and whose amount corresponds to one symbol of the spreading code (sampled data the sampling point of which is deviated by ½ chip are taken out from the memory, and it is set as one period of the spreading code of the reception signal) is multiplied by a predetermined one symbol of the spreading code (one period of the spreading code) every chip, and the sum of the multiplied values is calculated and output as a symbol signal representing the first correlation value. As an example, it is repeated at 32 times at the period of the spreading code, for example, a spreading ratio of 16 (in the case where the period of the spreading code is equal to 16 chips) at an interval of ½ chip.

However, in the first correlator 4, when the number of chips of the period of the spreading code is larger than the number of chips in the search range like a case where a long code is used, the repetition is made at the times corresponding to the number of chips which are desired to be searched, that is, at 100 times when the number of chips to be searched is equal to 50. Further, in the first correlator 4, when the chip interval of the chips for which the search is required is smaller than ½ chip, for example, it is equal to ¼ chip, the symbol signal thereof is interpolated by an FIR low pass interpolating filter to prepare a symbol signal every despreading timing ¼ chip.

In the symbol integrator 5, for known symbols for which the information of transmission signal is known, that is, pilot symbols, etc. which are known in a transmission system, the symbol signal which is despread at an interval of ¼ chip is demodulated on the basis of the theoretical value thereof. On the other hand, for unknown symbols, the symbol signal is demodulated on the basis of a judgment value which is obtained on the basis of a judgement after demodulation. Thereafter, the integration is made over plural symbols to perform a plural-symbol integration. The symbol integration is performed over all the symbols of a slot or some symbols of the slot, and the square of I components of the integrated symbol signal and the square of Q components of the integrated symbol signal are added to calculate the power value thereof and then transmit it to the short-time integration path search unit 6 and the long-time integration path search unit 7. In the short-time integration path search unit 6 and the long-time integration path search unit 7, the power value thus transmitted is added (integrated) over one or more slots to perform an inter-slot integration.

For example, in the short-time integration path search unit 6, this power value is integrated over 16 slots, four higher power values are selected, and the timing thereof and the average power per slot are transmitted to the demodulation path selection unit 8. Further, in the long-time integration path search unit 7, the integration of the power value is performed for a longer than that of the short-time integration path search unit 6, for example, the power value is integrated over 416 slots, and then four higher power values are selected to transmit the timing thereof and the average power per slot to the demodulation path selection unit 8.

The difference between the short-time integration path search unit 6 and the long-time integration path search unit 7 resides in the number of slots over which the integration is performed. That is, the integration slot number of the short-time integration path search unit 6 is set to be smaller than the integration slot number of the long-time integration search unit 7.

In the case where the slot length is short, the symbol integrator 5 may perform the symbol integration over n slots (n represents an integer of 2 or more), then determine the power value and then transmits the power value to the short-time integration power search unit 6 and the long-time integration path search unit 7 every n slots. Conversely, in the case where the slot length is long, the symbol integrator 5 may divide one slot into m parts (m represents an integer of 2 or more), perform the symbol integration every part, calculate the power of the symbol integration result over the m parts, calculate the average power of the slot and then transmit the power value to the short-time integration path search unit 6 and the long-time integration path search unit 7. At any rate, in the short-time integration power search unit 6 and the long-time integration path search unit 7, the interslot-integrated signals whose power is above a specific level or some of then are selected to perform a preliminary selection of paths and the average power per slot is transmitted to the demodulation path selection unit 8 at the timing thereof.

In the demodulation path selection unit 8, a demodulation path for allocating a finger is finally selected from the path timing notified from the short-time integration path search unit 6 and the long-time integration path search unit 7 every antenna by referring to the average power per slot, and after the selection, the path timing (which is the reception timing for demodulation, and regarded as demodulation path) based on the selected antenna number and code phase is notified to the second correlator 9.

As the selection method are used a method of allocating the demodulation path from all the timings in the magnification order of the average power per slot, a method of multiplying the power from the short-time integration path search unit 6 by a weight real number α with the weight real number a set as a fixed value and then allocating the demodulation path in the magnification order of the power, a method of multiplying the power from the short-time integration path search unit 6 by a weight real number α while the weight real number α is varied in accordance with a signal interference ratio (SIR), that is, the weight real number α is set to a small value when the signal interference ratio is small while the weight real number a is set to a large value when the signal interference ratio is large, and then allocating the demodulation path in the magnification order of the power, a method of allocating the demodulation paths in a fixed manner, for example, allocating demodulation paths of i from the short-time integration path search unit 6 and demodulation paths of j from the long-time integration path search unit 7 (i≠j), etc. In any method, it is inhibited to select two timings containing the same timing or an adjacent timing thereto.

In the second correlator 9, the reception signal from the antenna corresponding to the antenna number is despread at the notified timing, and the correlation signal representing the second correlation value is transmitted to the detector 10. In the detector 10, the detection signal obtained by detecting the correlation signal is transmitted to the RAKE/SD unit 11, and the RAKE synthesis and the SD synthesis are performed in the RAKE/SD unit 11 to obtain a composite signal. Thereafter, the composite signal is identified, and it is notified as a judgment value to the short-time integration path search unit 6 and the long-time integration path search unit 7.

Figure 2:
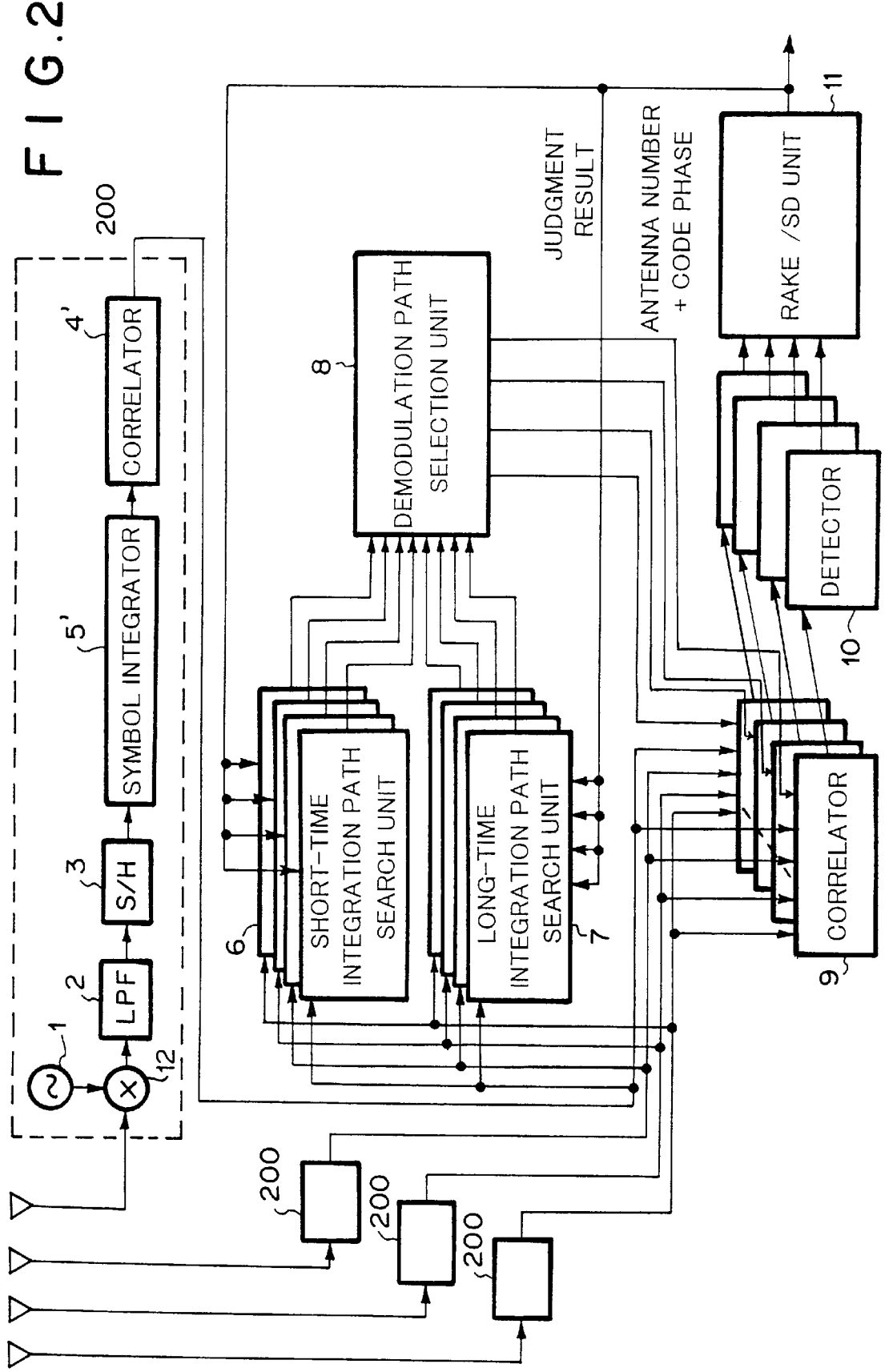
FIG. 2 is a block diagram showing the basic construction of a reception unit which is a main part of a spread spectrum communication synchronization acquisition demodulating apparatus according to a second embodiment of the present invention.
Figure 3:
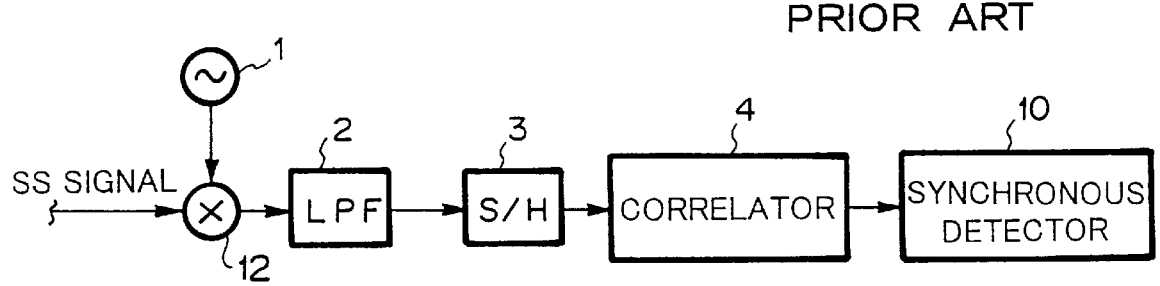
FIG. 3 is a block diagram showing the basic construction of a synchronizing circuit used in a conventional spread spectrum communication receiver.
Figure 4:
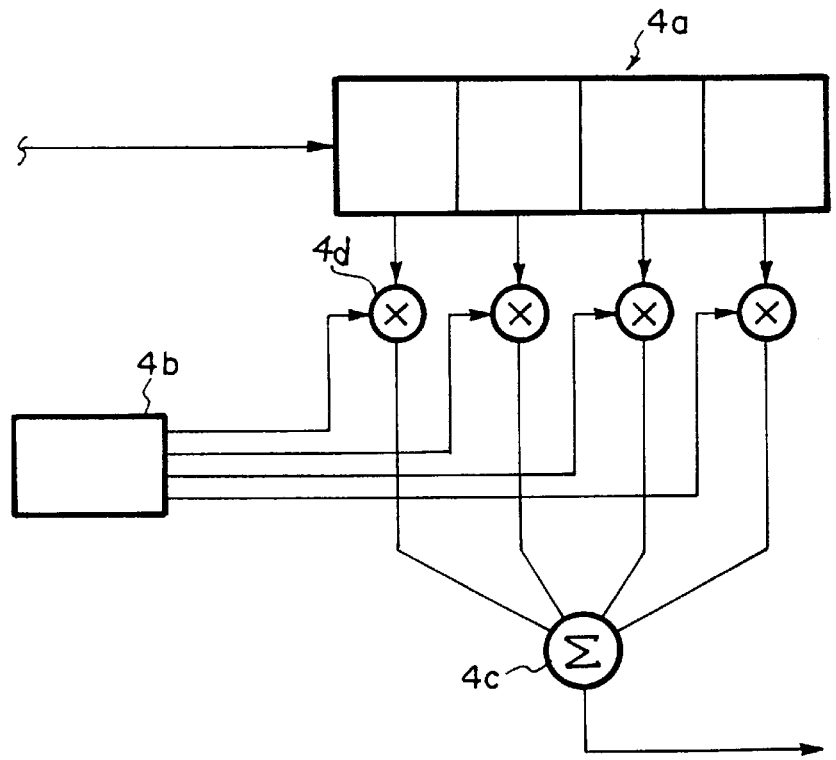
FIG. 4 is a schematic diagram showing a correlator having a matched filter structure which is provided to the synchronizing circuit shown in FIG. 3.

FIG. 2 is a block diagram showing the basic construction of the reception unit which is the main part of the spread spectrum communication synchronization acquisition demodulating apparatus according to a second embodiment of the present invention.

The spread spectrum communication synchronization acquisition demodulating apparatus includes a synchronizing circuit 200 comprising a local oscillation 1 and a low pass filter (LPF) 2 which serve as a signal converter for converting a reception signal to a base band signal with a spreading code set as one symbol period, a sample hold circuit (S/H) 3 for sampling and holding the base band signal and outputting the sampling signal, a symbol integrator 5' for demodulating the sampling signal on the basis of a theoretical value of a symbol or a judgment value after demodulation for an unknown symbol, and adding plural symbols to calculate a symbol integration value, and a first correlator 4' for correlating the symbol integration value and the spread signal based on the spreading code to determine the power of the correlation and obtain the power value, in place of the synchronizing circuit 100 of the embodiment 1.

The spread spectrum communication synchronization acquisition demodulating apparatus is provided with a short-time integration path search unit 6 for adding power values of plural slots (i.e., for integrating the power value for the integration time corresponding to the plural slots) and select higher power values in the magnification order of power per slot from a larger power value to a lower power value by the number of the first correlators 4', a long time integration path search unit 7 for integrating the power value for an integration time longer than that of the short-time integration path search unit 6 by the time corresponding to plural slots and selecting higher power values in the magnification order of power per slot from a higher power value to a lower power value by the number of the first correlators 4', a demodulation path selection unit 8 for selecting reception timings for demodulation in the magnification order of power per slot from timings which are selected by excluding the same timing and adjacent timings thereto in the short-time integration path search unit 6 and the long-time integration path search unit 7, a second correlator 9 for correlating the reception signal and the spread signal at the reception timing for demodulation to obtain a correlation value, a detector 10 for detecting a correlation value and outputting a detection signal, and a RAKE/SD unit 11 serving as a signal synthesizing unit for outputting a judgment value on the basis of a composite signal which is obtained by subjecting the detection signal to the RAKE synthesis and the space diversity (SD) synthesis.

That is, in the spreading code synchronization circuit, the period of the spreading code is set as one symbol. First, in the synchronizing circuit 200, the reception signal which is a spread spectrum (SS) signal received by the antenna is received by the antenna and converted to a base band signal in the local oscillator 1 and the low pass filter (LPS) 2. Thereafter, the base band signal is sampled every ½ chip in the sample hold circuit (S/H) 3. In the symbol integrator 5', the sample data of every symbol in the sampling signal at the ½-chip interval are used. The data are demodulated on the basis of the theoretical values of pilot symbols which are inserted at fixed positions of the slot by the number of symbols which are desired to be integrated, or a judgment value after demodulation when the symbol is unknown, and the integration thereof is made over plural symbols to obtain a symbol integration value. This process is also carried out at other sampling points which are deviated by 0.5 chip, 1 chip, 1.5 chip . . . .

In the correlator 4', the symbol integration value which is obtained by the demodulation and the integration is multiplied by one symbol of the spreading code every chip, and the sum of the multiplication is correlated to determine the power of the correlation and calculate the power value. As an example, this operation is repeated at (the spreading ratio x the number of symbols to be searched) at ½ chip interval, for example, at 256 times for symbols having a spreading ratio of 16 and a search range of 8.

However, in the first correlator 4', when the interval of chips to be searched is smaller than ½ chip, for example, when it is set to ¼ chip, the symbol signal thereof is interpolated through the FIR low pass interpolating filter to form a symbol signal every despreading timing ¼ chip, finally the square value of I components and the square value of Q components are added to calculate the power value, and then the calculation result is transmitted to the short-time integration path search unit 6 and the long-time integration path search unit 7. In the short-time integration path search unit 6 and the long-time path search unit 7, the power value is integrated over one or more slots, thereby performing the inter-slot integration.

For example, in the short-time integration path search unit 6, the power value is integrated over 16 slots, four higher power values are selected, and the timing and the corresponding average power per slot are transmitted to the demodulation path selection unit 8. In the long-time integration path search unit 7, the integration time is set to be longer than that of the short-time integration path search unit 6. For example, the power value is integrated over 416 slots, four higher power values are selected, and the timing and the corresponding average power per slot are transmitted to the demodulation path selection unit 8.

In the demodulation path selection unit 8, every two reception timings for demodulation and every two antenna numbers based on the code phase notified from the short-time integration path search unit 6 and the long-time integration path search unit 7 every antenna are selected and transmitted to the second correlator 9. However, when the totally four reception timings for demodulation contain the same timing or adjacent timings thereto, by referring to the average power per slot, the reception timing for demodulation and the antenna number which correspond to the larger average power per slot are added.

In the correlator 9, the reception signal from the antenna corresponding to the antenna number is despread at the notified reception timing for demodulation, and the correlation signal representing the correlation value is transmitted to the detector 10. In the detector 10, the detection signal obtained by detecting the correlation signal is transmitted to the RAKE/SD unit 11. In the RAKE/SD unit 11, the RAKE synthesis and the SD synthesis are performed to obtain the composite signal, and then the composite signal is identified and then transmitted as a judgment value to the short-time integration path search unit 6 and the long-time integration path search unit 7.

In the first and second embodiments, the RAKE/SD unit 11 serving as the signal synthesizing unit is designed to perform the RAKE synthesis and the space diversity (SD) synthesis to obtain the composite signal for obtaining the judgment value. However, in place of this function, there may be set the function of performing only any one of the RAKE synthesis and the space diversity (SD) synthesis to obtain the composite signal for obtaining the judgement value.

As described above, according to the spread spectrum communication synchronization acquisition demodulating apparatus, the proper path search on the track to the high-speed path variation and the track to the path which exists stationarily for a long time can be performed without lack. Therefore, the error judgment on the synchronization position can be suppressed, and thus the synchronization timing can be properly acquired. In addition, even when the synchronization timing varies, the tracking can be immediately performed, so that reception quality can be enhanced. Further, even when the short-time integration path search cannot be tracked to the optimum timing due to lots of noise, the long-time integration path search tracks the reception timing, and thus the reception can be stably performed. In addition, the transmission side is not required to have a strong transmission output in order to constant reception quality, so that the interference can be suppressed.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A spread spectrum communication synchronization acquisition demodulating apparatus of a spreading code synchronizing circuit provided in a radio communication apparatus for performing a data communication in which when a spread spectrum signal which is obtained by modulating transmission data and subjecting the modulated data to spread spectrum processing using a spreading code and then transmitted from a transmission side is demodulated as a reception signal to reproduce reception data at a reception side, the spread spectrum signal is subjected to despread spectrum processing using the same spreading code as the transmission side and then demodulated at the reception side, comprising:

a signal converter for converting the reception signal to a base band signal;

a sample hold circuit for sampling the base band signal, holding the sampled base band signal and outputting the sampling signal;

a first demodulation correlator for correlating the sampling signal and the spread signal based on the spreading code to obtain a first correlation value;

a symbol integrator for demodulating the first correlation value on the basis of any one of a theoretical value of a symbol corresponding to the first correlation value when the symbol is known or a judgment value after demodulation when the symbol is unknown and integrating the demodulation result over plural symbols to calculate the power of the integration of the plural symbols, thereby obtaining a power value;

a short-time integration path search unit for integrating the power value for the integration time corresponding to the plural slots and selecting higher power values, the number thereof corresponding to the number of the first correlators, in the magnification order of the power per slot from a larger power per slot to a lower power per slot;

a long-time integration path search unit for integrating the power value for an integration time longer than that of said short-time integration path search unit by the time corresponding to plural slots and selecting higher power values, the number thereof corresponding to the number of the first correlators, in the magnification order of power per slot from a larger power value to a lower power value;

a demodulation path selection unit for selecting a reception timing for demodulation from the timings of the power values selected in said short-time and long-time integration path search units in the order of the magnification of power per slot;

a second correlator for correlating the reception signal and the spread signal on the basis of the reception timing for demodulation to obtain a second correlation value;

a detector for detecting the second correlation value and outputting a detection signal; and a signal composite unit for outputting a judgment value on the basis of a composite signal which is obtained by transmitting the detection signal to a RAKE/SD (Space Diversity) unit through the corresponding path to perform any one of RAKE synthesis and space diversity (SD) synthesis.

2. The spread spectrum communication synchronization acquisition demodulating apparatus as claimed in claim 1, wherein in said demodulation path selection unit, the power per slot which corresponds to the timing selected in said short-time integration path search unit and is multiplied by a weight real number a is compared with the power per slot which corresponds to the timing selected in said long-time integration path search unit, the same timing and adjacent timings thereto are excluded, and the reception timings for demodulation are selected in the order of magnitude.

3. The spread spectrum communication synchronization acquisition demodulating apparatus as claimed in claim 1, wherein the weight real number a is set to a large value when a signal interference ratio (SIR) is large and set to a small value when the signal interference ratio is small, and in said demodulation path selector, the power per slot which corresponds to the timing selected in said short-time integration path search unit and is multiplied by a weight real number a is compared with the power per slot which corresponds to the timing selected in said long-time integration path search unit, the same timing and adjacent timings thereto are excluded, and the reception timings for demodulation are selected in the order of magnitude.

4. The spread spectrum communication synchronization acquisition demodulating apparatus as claimed in claim 1, wherein in said demodulation path selector a specific predetermined number of timings which are selected in the magnitude order of the power per slot which corresponds to the timing selected in said short-time integration path search unit is compared with a specific predetermined number of timings which are selected in the magnitude order of the power per slot which corresponds to the timing selected in said long-time integration path search unit, and the same timing and adjacent timings thereto are excluded to select reception timings for demodulation.

5. The spread spectrum communication synchronization acquisition demodulating apparatus as claimed in claim 1, wherein in said symbol integrator the correlation value is demodulated on the basis of the theoretical value of the symbol corresponding to plural slots whose number exceeds 1 or the judgment value thereof.

6. The spread spectrum communication synchronization acquisition demodulating apparatus as claimed in claim 5, wherein in said demodulation path selection unit, the power per slot which corresponds to the timing selected in said short-time integration path search unit and is multiplied by a weight real number a is compared with the power per slot which corresponds to the timing selected in said long-time integration path search unit, the same timing and adjacent timings thereto are excluded, and the reception timings for demodulation are selected in the order of magnitude.

7. The spread spectrum communication synchronization acquisition demodulating apparatus as claimed in claim 5, wherein the weight real number a is set to a large value when a signal interference ratio (SIR) is large and set to a small value when the signal interference ratio is small, and in said demodulation path selector, the power per slot which corresponds to the timing selected in said short-time integration path search unit and is multiplied by a weight real number a is compared with the power per slot which corresponds to the timing selected in said long-time integration path search unit, the same timing and adjacent timings thereto are excluded, and the reception timings for demodulation are selected in the order of magnitude.

8. The spread spectrum communication synchronization acquisition demodulating apparatus as claimed in claim 5, wherein in said demodulation path selector a specific predetermined number of timings which are selected in the magnitude order of the power per slot which corresponds to the timing selected in said short-time integration path search unit is compared with a specific predetermined number of timings which are selected in the magnitude order of the power per slot which corresponds to the timing selected in said long-time integration path search unit, and the same timing and adjacent timings thereto are excluded to select reception timings for demodulation.

9. The spread spectrum communication synchronization acquisition demodulating apparatus as claimed in claim 1, wherein in said symbol integrator the first correlation value is demodulated on the basis of the theoretical value of the symbol corresponding to each of plural parts to which a slot is divided, or the judgment value thereof, the demodulation result is integrated over plural symbols to calculate the power of the integration of the plural symbols, and then the power values of the plural parts are added to determine the power of the slot concerned.

10. The spread spectrum communication synchronization acquisition demodulating apparatus as claimed in claim 9, wherein in said demodulation path selection unit, the power per slot which corresponds to the timing selected in said short-time integration path search unit and is multiplied by a weight real number a is compared with the power per slot which corresponds to the timing selected in said long-time integration path search unit, the same timing and adjacent timings thereto are excluded, and the reception timings for demodulation are selected in the order of magnitude.

11. The spread spectrum communication synchronization acquisition demodulating apparatus as claimed in claim 9, wherein the weight real number a is set to a large value when a signal interference ratio (SIR) is large and set to a small value when the signal interference ratio is small, and in said demodulation path selector, the power per slot which corresponds to the timing selected in said short-time integration path search unit and is multiplied by a weight real number a is compared with the power per slot which corresponds to the timing selected in said long-time integration path search unit, the same timing and adjacent timings thereto are excluded, and the reception timings for demodulation are selected in the order of magnitude.

12. The spread spectrum communication synchronization acquisition demodulating apparatus as claimed in claim 9, wherein in said demodulation path selector a specific predetermined number of timings which are selected in the magnitude order of the power per slot which corresponds to the timing selected in said short-time integration path search unit is compared with a specific predetermined number of timings which are selected in the magnitude order of the power per slot which corresponds to the timing selected in said long-time integration path search unit, and the same timing and adjacent timings thereto are excluded to select reception timings for demodulation.

13. A spread spectrum communication synchronization acquisition demodulating apparatus of a spreading code synchronizing circuit provided in a radio communication apparatus in which when a spread spectrum signal transmitted from a transmission side while subjected to spread spectrum processing with a spreading code after transmission data are modulated is subjected to reception demodulation as a reception signal to reproduce the reception data at a reception side, the spread spectrum signal is subjected to despread spectrum processing with the same spreading code as the transmission side and then demodulated at the reception side, comprising:

a signal converter for converting a received signal to a base band signal with a spreading code set as one symbol period;

a sample hold circuit for sampling the base band signal, holding the sampling signal and outputting the sampling signal;

a symbol integrator for demodulating the sampling signal of the basis of the theoretical value of a symbol when the symbol is known or a judgment value after demodulation for an unknown symbol, integrating the demodulation result over plural symbols to obtain a symbol integration value;

a first correlator for correlating the symbol integration value and the spread signal based on the spreading code to determine the power of the correlation and obtain a power value;

a short-time integration path search unit for adding power values of plural slots and selecting higher power values in the magnification order of power per slot from a larger power value to a lower power value by the number of the first correlators;

a long-time integration path search unit for adding power values of plural slots whose number corresponds to the time longer than that of the short-time integration path search unit by the time corresponding to plural slots and selecting higher power values in the magnification order of power per slot from a higher power value to a lower power value by the number of the first correlators;

a demodulation path selection unit for selecting a reception timing for demodulation from the timings of the power values which are selected by excluding the same timing and adjacent timings thereto in said short-time and long-time integration path search units in the magnification order of power per slot;

a second correlator for correlating the reception signal and the spread signal on the basis of the reception timing for demodulation to obtain a second correlation value;

a detector for detecting the correlation value and outputting a detection signal; and a signal composite unit for outputting a judgment value on the basis of a composite signal which is obtained by transmitting the detection signal to a RAKE/SD (Space Diversity) unit through the corresponding path to perform any one of RAKE synthesis and space diversity (SD) synthesis.

14. The spread spectrum communication synchronization acquisition demodulating apparatus as claimed in claim 13, wherein in said demodulation path selection unit, the power per slot which corresponds to the timing selected in said short-time integration path search unit and is multiplied by a weight real number $\alpha$ is compared with the power per slot which corresponds to the timing selected in said long-time integration path search unit, the same timing and adjacent timings thereto are excluded, and the reception timings for demodulation are selected in the order of magnitude.

15. The spread spectrum communication synchronization acquisition demodulating apparatus as claimed in claim 13, wherein the weight real number $\alpha$ is set to a large value when a signal interference ratio (SIR) is large and set to a small value when the signal interference ratio is small, and in said demodulation path selector, the power per slot which corresponds to the timing selected in said short-time integration path search unit and is multiplied by a weight real number $\alpha$ is compared with the power per slot which corresponds to the timing selected in said long-time integration path search unit, the same timing and adjacent timings thereto are excluded, and the reception timings for demodulation are selected in the order of magnitude.

16. The spread spectrum communication synchronization acquisition demodulating apparatus as claimed in claim 13, wherein in said demodulation path selector a specific predetermined number of timings which are selected in the magnitude order of the power per slot which corresponds to the timing selected in said short-time integration path search unit is compared with a specific predetermined number of timings which are selected in the magnitude order of the power per slot which corresponds to the timing selected in said long-time integration path search unit, and the same timing and adjacent timings thereto are excluded to select reception timings for demodulation.

17. The spread spectrum communication synchronization acquisition demodulating apparatus as claimed in claim 13,
wherein in said symbol integrator the sampling signal is demodulated on the basis of the theoretical of the symbol corresponding to the sample value of plural slots whose number exceeds 1 as the sampling signal, or a judgment value.

18. The spread spectrum communication synchronization acquisition demodulating apparatus as claimed in claim 17,
wherein in said demodulation path selection unit, the power per slot which corresponds to the timing selected in said short-time integration path search unit and is multiplied by a weight real number α is compared with the power per slot which corresponds to the timing selected in said long-time integration path search unit, the same timing and adjacent timings thereto are excluded, and the reception timings for demodulation are selected in the order of magnitude.

19. The spread spectrum communication synchronization acquisition demodulating apparatus as claimed in claim 17, wherein the weight real number α is set to a large value when a signal interference ratio (SIR) is large and set to a small value when the signal interference ratio is small, and in said demodulation path selector, the power per slot which corresponds to the timing selected in said short-time integration path search unit and is multiplied by a weight real number α is compared with the power per slot which corresponds to the timing selected in said long-time integration path search unit, the same timing and adjacent timings thereto are excluded, and the reception timings for demodulation are selected in the order of magnitude.

20. The spread spectrum communication synchronization acquisition demodulating apparatus as claimed in claim 17,
wherein in said demodulation path selector a specific predetermined number of timings which are selected in the magnitude order of the power per slot which corresponds to the timing selected in said short-time integration path search unit is compared with a specific predetermined number of timings which are selected in the magnitude order of the power per slot which corresponds to the timing selected in said long-time integration path search unit, and the same timing and adjacent timings thereto are excluded to select reception timings for demodulation.

* * * * *